United States Patent
Vetere, II (10) Patent No.: US 11,951,884 B2
(45) Date of Patent: Apr. 9, 2024

(54) SELF-BIASING RECLINER CROSS-TALK TUBE COUPLER

(71) Applicants: MAGNA SEATING INC., Aurora (CA); Louis Vetere, II, Commerce Township, MI (US)

(72) Inventor: Louis Vetere, II, Commerce Township, MI (US)

(73) Assignee: Magna Seating Inc., Aurora (CA)

( * ) Notice: Subject to any disclaimer, the term of this patent is extended or adjusted under 35 U.S.C. 154(b) by 316 days.

(21) Appl. No.: 17/620,857

(22) PCT Filed: Jun. 18, 2020

(86) PCT No.: PCT/US2020/070153
§ 371 (c)(1),
(2) Date: Dec. 20, 2021

(87) PCT Pub. No.: WO2020/257821
PCT Pub. Date: Dec. 24, 2020

(65) Prior Publication Data
US 2022/0340053 A1    Oct. 27, 2022

Related U.S. Application Data

(60) Provisional application No. 62/863,353, filed on Jun. 19, 2019.

(51) Int. Cl.
*B60N 2/225*    (2006.01)
*B60N 2/235*    (2006.01)

(52) U.S. Cl.
CPC ......... *B60N 2/2251* (2013.01); *B60N 2/2356* (2013.01); *B60N 2205/20* (2013.01); *B60N 2205/50* (2013.01)

(58) Field of Classification Search
CPC ............................ B60N 2/2251; B60N 2/2356
See application file for complete search history.

(56) References Cited

U.S. PATENT DOCUMENTS

| | | | |
|---|---|---|---|
| 6,712,429 B2 | 3/2004 | Villarroel | |
| 6,910,737 B2 | 6/2005 | Hosokawa | |
| 8,251,451 B2 * | 8/2012 | Dziedzic | B60N 2/236 297/367 R |
| 8,528,977 B2 * | 9/2013 | Naughton | B60N 2/2356 297/367 R |
| 2007/0039183 A1 | 2/2007 | Krambeck et al. | |

FOREIGN PATENT DOCUMENTS

EP    0407265    1/1991
WO    2013068803    5/2013

\* cited by examiner

*Primary Examiner* — Anthony D Barfield
(74) *Attorney, Agent, or Firm* — Miller Canfield (57) ABSTRACT

A coupler for coupling a cross-talk tube of a vehicle seat with a shaft of a dual recliner assembly. The coupler comprises a generally cylindrical body extending axially between an inboard end and an outboard end. The inboard end includes an inboard aperture having an inboard planar surface. The outboard end includes an outboard aperture having an outboard planar surface. The inboard planar surface and the outboard planar surface transition from an axially offset position to an axially aligned position when the coupler is installed with the cross-talk tube and the shaft of the dual recliner assembly.

15 Claims, 6 Drawing Sheets

SELF-BIASING RECLINER CROSS-TALK TUBE COUPLER

CROSS-REFERENCE TO RELATED APPLICATIONS

This application claims priority to U.S. provisional patent application No. 62/863,353, filed Jun. 19, 2019, which is incorporated herein by reference.

TECHNICAL FIELD

The present invention relates to recliners for seats in automotive vehicles, and more particularly, to a self-biasing cross-talk tube coupler operatively coupled between a dual recliner assembly to bias a cross-talk tube in the under-biased condition.

BACKGROUND OF THE INVENTION

Automotive vehicles include seat assemblies for supporting occupants within the vehicle. A seat assembly typically includes a seat cushion and a seat back. Usually a recliner assembly is operatively coupled between the seat cushion and seat back for allowing selective pivotal adjustment of the seat back relative to the seat cushion between a plurality of reclined positions.

It is common for a seat assembly to include a dual recliner assembly, that is, an outboard master recliner and an inboard slave recliner. U.S. Pat. No. 8,459,743, which is incorporated herein by reference, discloses one embodiment of a recliner. Typically, a cross-talk tube extends between master and slave recliners to synchronize movement of the recliners between the locked and unlocked positions. The cross-talk tube allows for both axial and rotational tolerances between the master and slave recliners. U.S. Pat. No. 6,712,429, which is incorporated herein by reference, discloses one embodiment of a cross-talk tube in a dual recliner assembly.

Perfect release timing of the recliners between the locked and unlocked positions is difficult due to variances in recliner release positions and losses in the cross-talk tube. The master to slave release timing differences may result in one of two conditions. In the "over-biased" condition, the slave recliner is partially unlocked when the master recliner is in the fully locked position. In the "under-biased" condition, there is a delay between the unlocking of the master recliner and the unlocking of the slave recliner. Because the over-biased condition could give rise to potential safety problems, it is preferable to bias the cross-talk tube in the under-biased condition. Biasing the cross-talk tube requires several steps. In particular, a specific torque must be applied to the cross-talk tube in both the locking direction and the unlocking direction to ensure a minimum rotation angle. The cross-talk tube is then rotated in the locking direction until the under-biased angle is obtained.

It is desirable to provide a simpler mechanism for biasing the cross-talk tube in the under-biased condition.

SUMMARY OF THE INVENTION

According to one embodiment, there is provided a coupler for coupling a cross-talk tube of a vehicle seat with a shaft of a dual recliner assembly. The coupler comprises a generally cylindrical body extending axially between an inboard end and an outboard end. The inboard end includes an inboard aperture having an inboard planar surface. The outboard end includes an outboard aperture having an outboard planar surface. The inboard planar surface and the outboard planar surface transition from an axially offset position to an axially aligned position when the coupler is installed with the cross-talk tube and the shaft of the dual recliner assembly.

According to another embodiment, there is provided a dual recliner assembly for a vehicle seat. The assembly comprises a first shaft, a second shaft, a cross-talk tube, and a coupler. The cross-talk tube has a first tube end and an opposite second tube end. The first tube end is fixedly coupled to the first shaft. The coupler has a first coupler end and an opposite second coupler end. The first coupler end is coupled to the second tube end. The first coupler end is twisted relative to the second coupler end. The first and second coupler ends are coupled to the second shaft.

According to another embodiment, there is provided a method of assembling a cross-talk tube onto a dual recliner assembly for a vehicle seat using a coupler. The cross-talk tube has a first tube end and an opposite second tube end. The coupler has a first coupler end and an opposite second coupler end. The dual recliner assembly includes a first recliner shaft and a second recliner shaft. The method comprises the steps of coupling the first coupler end with the second tube end, sliding the first tube end axially onto the first recliner shaft, sliding the second coupler end and the cross-talk tube axially onto the second recliner shaft, sliding the first coupler end and the cross-talk tube axially onto the second recliner shaft where the insertion of the second recliner shaft into the first coupler end causes the first coupler end and the cross-talk tube to twist relative to the second coupler end, and securing the first tube end onto the first recliner shaft.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1:
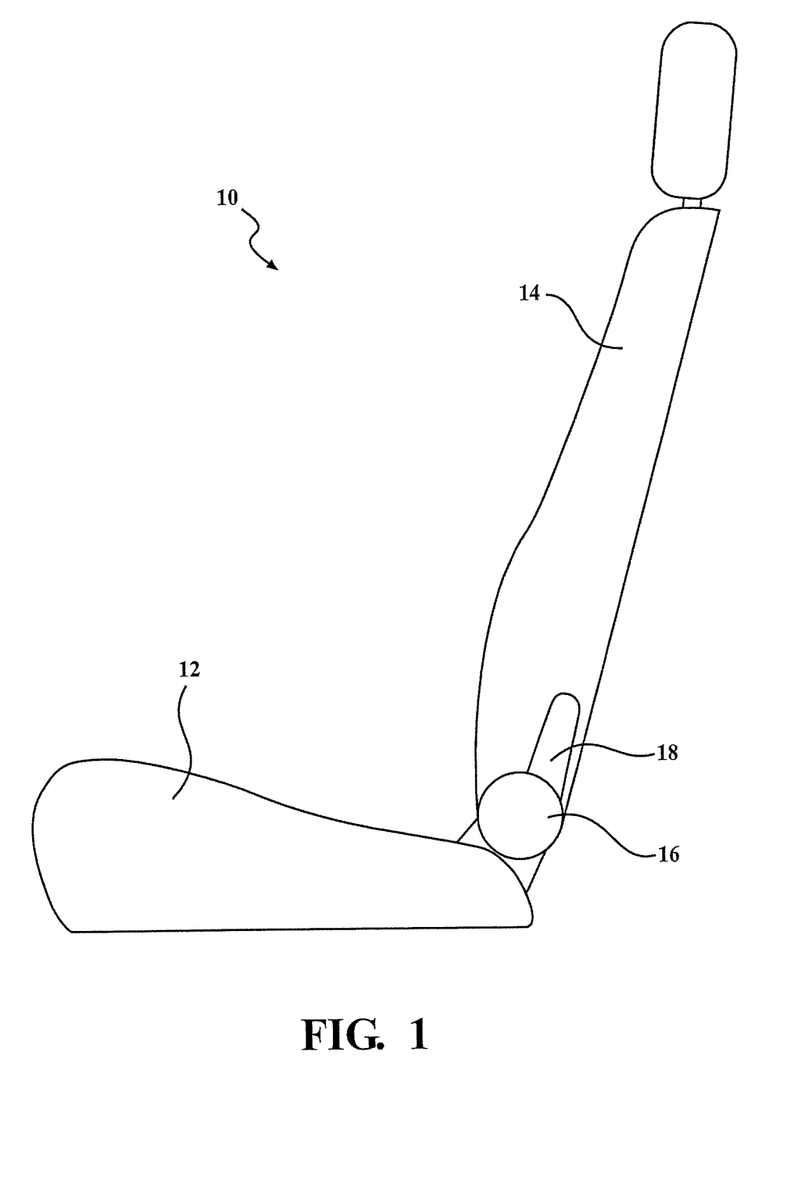
FIG. 1 is a side view of a seat assembly incorporating an embodiment of the invention.

FIG. 1 illustrates one embodiment of a seat assembly 10 for use in an automotive vehicle. The seat assembly 10 includes a seat cushion 12 and a seat back 14 operatively coupled to the seat cushion 12 for supporting a seat occupant in a generally upright seating position. A dual recliner assembly 16 is operatively coupled between the seat cushion 12 and the seat back 14 for providing selective locking and pivotal adjustment of the seat back 14 relative to the seat cushion 12 between a plurality of reclined positions. The dual recliner assembly 16 includes a handle. 18 to allow an occupant to manually actuate the dual recliner assembly 16.

Figure 2:
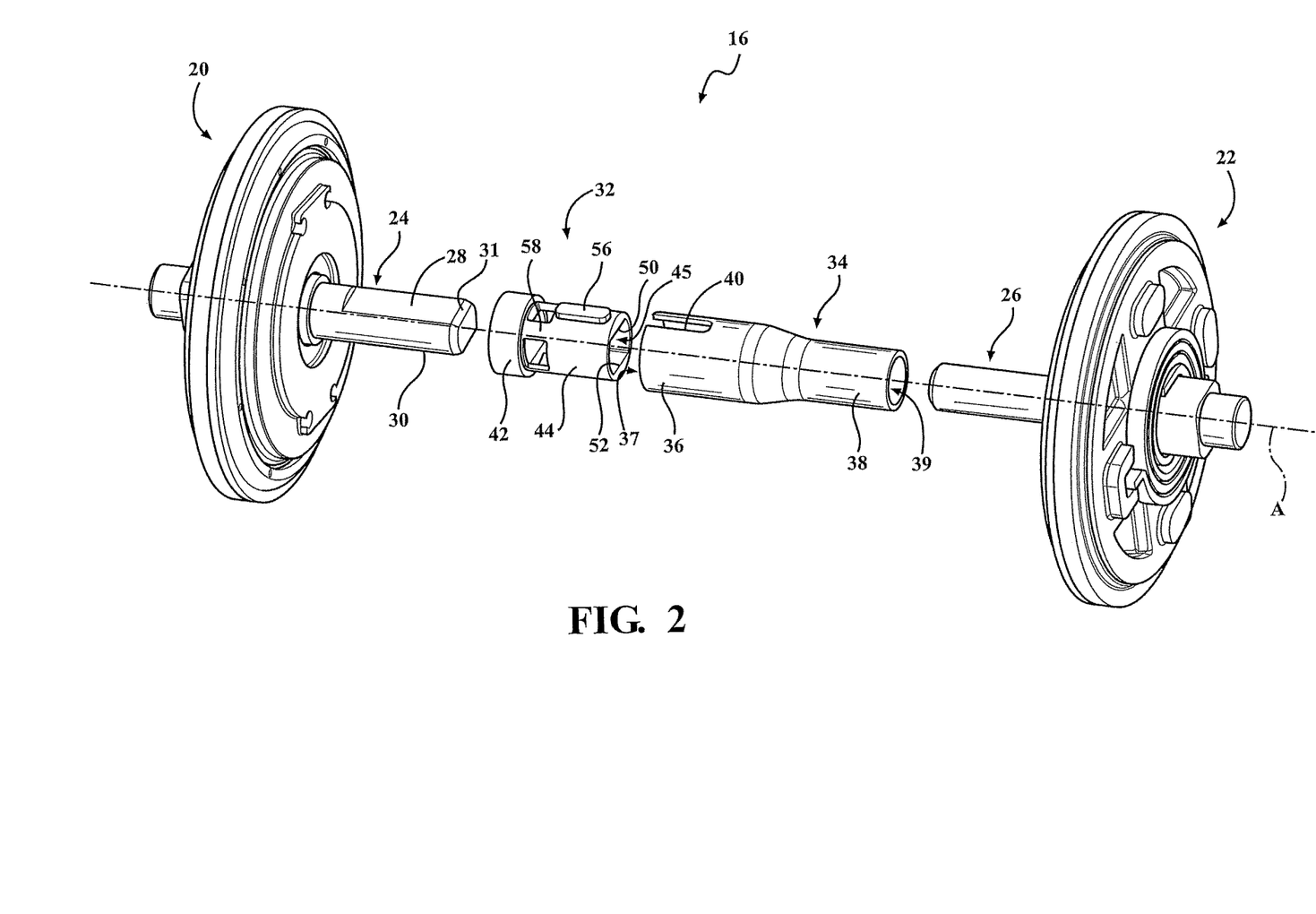
FIG. 2 is an exploded outboard perspective view of a dual recliner assembly according to one embodiment of the invention.

Referring to FIG. 2, the dual recliner assembly 16 includes a first inboard recliner 20 spaced apart from a second outboard recliner 22. Although referred to respectively as the inboard and outboard recliners, it should be appreciated that the first and second recliners may refer to the outboard and inboard recliners, respectively, without altering the scope of the invention. Each of the inboard and outboard recliners 20, 22 is movable between a locked position, which holds the seat back 14 in a selected reclined position, and an unlocked position, which allows rotational movement of the seat back 14. The inboard recliner 20 has an inboard recliner shaft 24 that moves the inboard recliner 20 between the locked and unlocked positions, and the outboard recliner 22 has an outboard recliner shaft 26 that moves the outboard recliner 22 between the locked and unlocked positions. The outboard recliner shaft 26 is generally cylindrical and extends axially inward towards the inboard recliner 20. The inboard recliner shaft 24 extends axially outward towards the outboard recliner 22. The cross section of the inboard recliner shaft 24 is generally cylindrical with opposing and generally parallel planar sections 28, 30. The inboard recliner shaft 24 includes a tapered distal end 31. The inboard and outboard shafts 24, 26 are aligned axially along longitudinal axis A.

The dual recliner assembly 16 also includes a self-biasing coupler 32 and a cross-talk tube 34. The self-biasing coupler 32 and the cross-talk tube 34 synchronize actuation of the inboard and outboard recliners 20, 22 between the locked and unlocked positions. The cross-talk tube 34 extends between an inboard end 36 and an opposite outboard end 38. The inboard end 36 is generally cylindrical and includes an opening 37 for receiving a portion of the self-biasing coupler 32. The inboard end 36 also includes a slot 40 extending in a longitudinal direction from the opening 37 toward the outboard end 38. The outboard end 38 of the cross-talk tube 34 is generally cylindrical and includes an opening 39 for receiving a portion of the outboard recliner shaft 26. Although the inboard end 36 of the cross-talk tube 34 is illustrated as having a diameter greater than the outboard end 38 of the cross-talk tube 34, it should be appreciated that the sizes of the various components of the dual recliner assembly 16 may vary without altering the scope of the invention.

Figure 3:
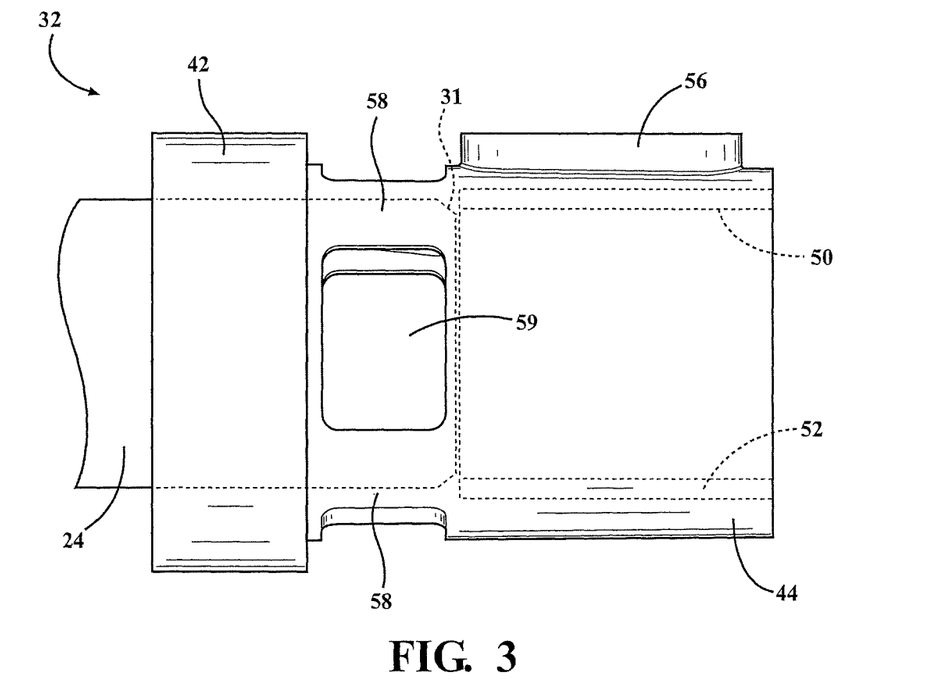
FIG. 3 is a side view of a self-biasing coupler according to one embodiment of the invention.
Figure 4:
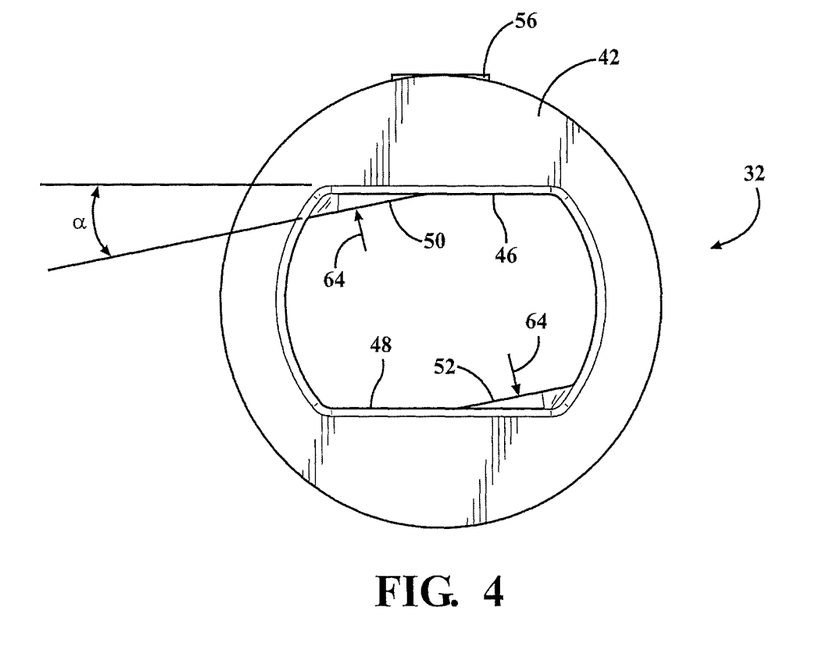
FIG. 4 is an inboard end view of the self-biasing coupler of FIG. 3.

Referring to FIGS. 2-4, the self-biasing coupler 32 connects the inboard end 36 of the cross-talk tube 34 with the inboard recliner shaft 24. The self-biasing coupler 32 extends between an inboard end 42 and an opposite outboard end 44. The inboard end 42 of the self-biasing coupler 32 is generally cylindrical and includes an aperture 43 having opposing and generally parallel inner planar surfaces 46, 48. The outboard end 44 of the self-biasing coupler 32 also is generally cylindrical and includes an aperture 45 having opposing and generally parallel inner planar surfaces 50, 52. The planar surfaces 46, 48 of the inboard end 42 are axially offset from the planar surfaces 50, 52 of the outboard end 44 by an under-biased angle α. Preferably, the under-biased angle α is less than 5°. More preferably, the under-biased angle α is approximately 2.5°±0.5°. The outboard end 44 of the self-biasing coupler 32 includes a projection 56 extending in the longitudinal direction configured to matingly engage with the slot 40 of the cross-talk tube 34 when the outboard end 44 of the self-biasing coupler 32 is inserted into the inboard end 36 of the cross-talk tube 34. The inboard 42 and outboard ends 44 of the self-biasing coupler 32 are connected by circumferentially spaced apart legs 58 extending generally in the longitudinal direction and defining generally equally spaced apart rectangular windows 59 therebetween. The self-biasing coupler 32 may be made from any polymer.

Figure 5:
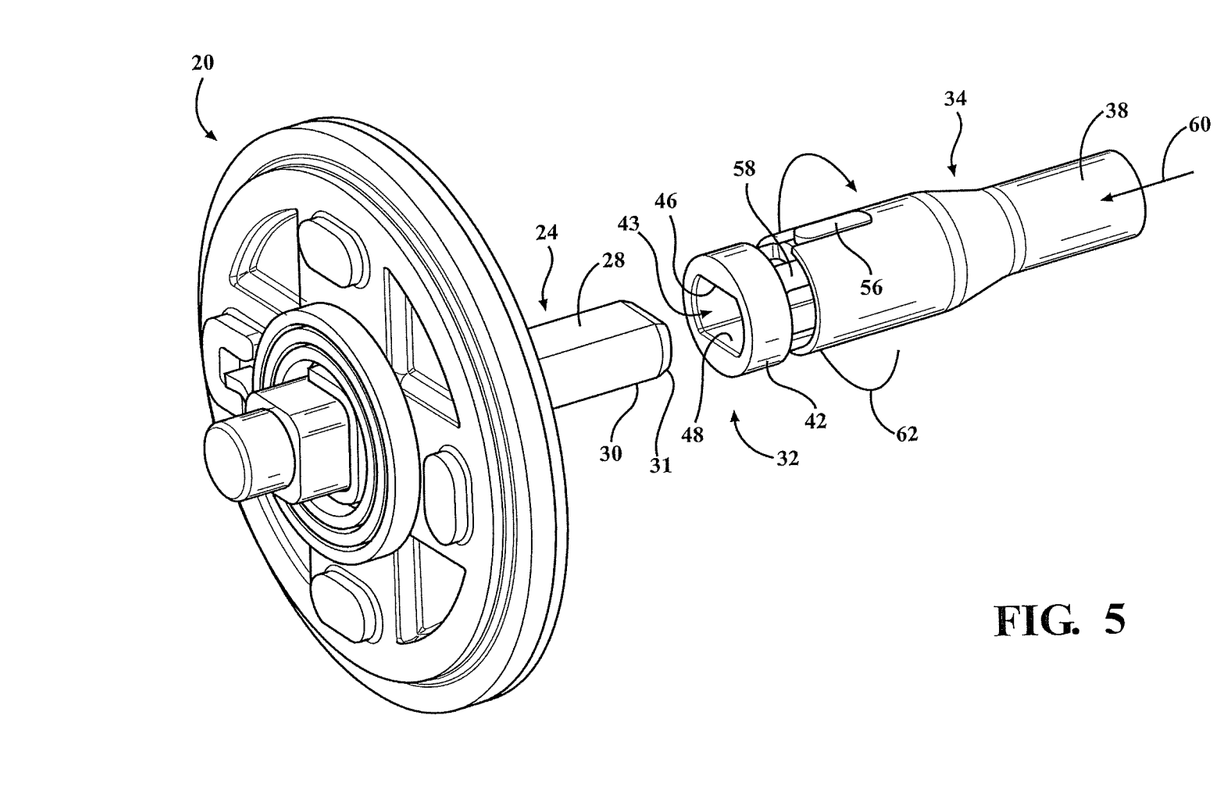
FIG. 5 is a partial exploded inboard perspective view of the dual recliner assembly.
Figures 6, 7, 8:
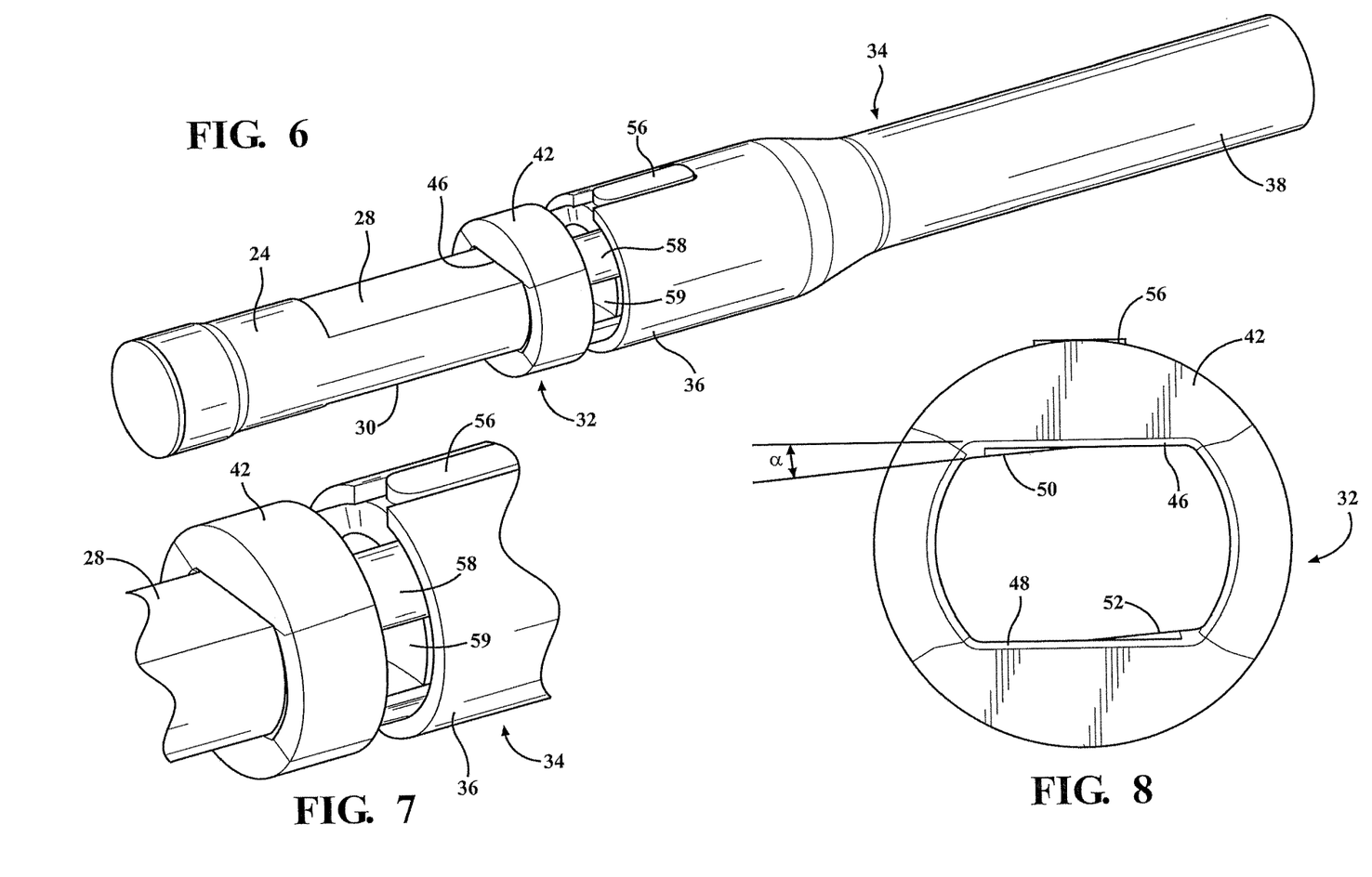
FIG. 6 is partial inboard perspective view of the dual recliner assembly before deformation of the self-biasing coupler.
FIG. 7 is a fragmentary perspective view of the self-biasing coupler of FIG. 6.
FIG. 8 is an inboard end view of the self-biasing coupler before deformation of the self-biasing coupler.
Figures 9, 10, 11:
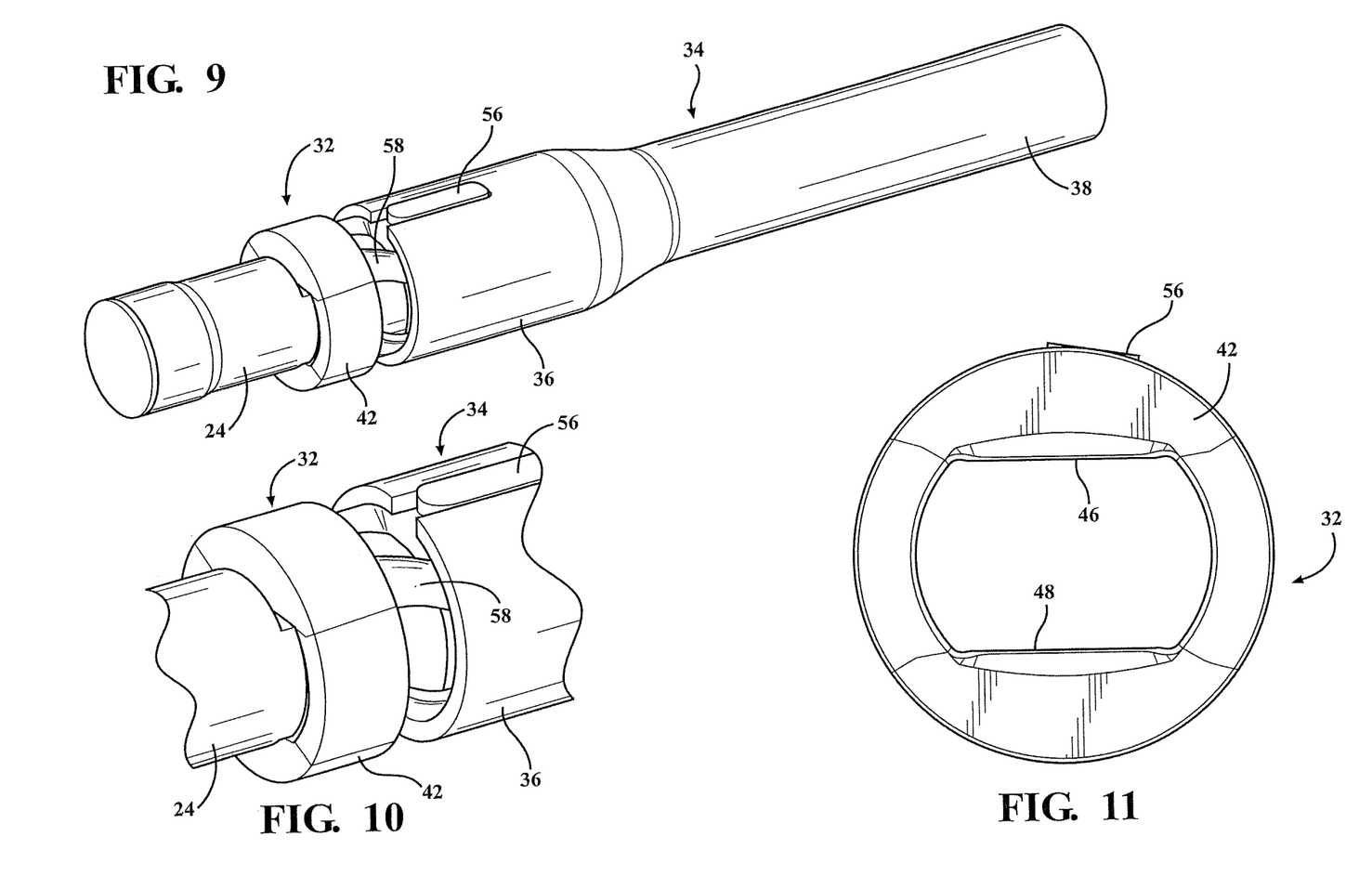
FIG. 9 is a partial inboard perspective view of the dual recliner assembly after deformation of the self-biasing coupler.
FIG. 10 is a fragmentary perspective view of the self-biasing coupler of FIG. 9.
FIG. 11 is an inboard end view of the self-biasing coupler after deformation of the self-biasing coupler.

Referring to FIGS. 2 and 5, during installation, the outboard end 44 of the self-biasing coupler 32 is inserted into the inboard end 36 of the cross-talk tube 34 with the projection 56 matingly engaged with the slot 40. With the self-biasing coupler 32 inserted into the cross-talk tube 34, the outboard end 38 of the cross-talk tube 34 axially slides onto the outboard recliner shaft 26. Referring to FIGS. 5-8, the inner planar surfaces 46, 48 of the inboard end 42 of the self-biasing coupler 32 are aligned with the planar sections 28, 30 of the inboard recliner shaft 24, and the assembly of the self-biasing coupler 32 and the cross-talk tube 34 slide onto the inboard recliner shaft 24 as illustrated by arrow 60. Referring to FIGS. 3-5, as the assembly of the self-biasing coupler 32 and the cross-talk tube 34 continue to slide axially along the inboard recliner shaft 24, the tapered distal end 31 of the inboard recliner shaft 24 engages the planar surfaces 50, 52 of the outboard end 44 and applies installation forces 64 on the planar surfaces 50, 52. The installation forces 64 cause the outboard end 44 of the self-biasing coupler 32 and the cross-talk tube 34 to twist relative to the inboard end 42 of the self-biasing coupler 32, as depicted by arrow 62. As a result, and as depicted in FIGS. 9-10, the self-biasing coupler 32 rotationally deforms at the legs 58, which form a weakened section of the self-biasing coupler 32. When the inboard recliner shaft 24 is fully inserted into the assembly of the self-biasing coupler 32 and the cross-talk tube 34, the inner planar surfaces 50, 52 of outboard end 44 are aligned with the inner planar surfaces 46, 48 of inboard end 42, as depicted in FIG. 11. While this torque on the self-biasing coupler 32 is maintained, the outboard end 38 of the cross-talk tube 34 may be fixedly secured to the outboard shaft 26 by any suitable means, such as by welding or by crimping the tube 34 against the outboard shaft 26.

The twisting of the outboard end 44 of the self-biasing coupler 32 relative to the inboard end 42 of the self-biasing coupler 32 biases the cross-talk tube 34 in the under-biased condition. Thus, the self-biasing coupler 32 synchronizes actuation of the recliner shafts 24, 26 through its deformation during the installation of the cross-talk tube 34 and the self-biasing coupler 32. Although the self-biasing coupler 32 is described and depicted as connecting the cross-talk tube 34 to the inboard recliner shaft 24, it should be appreciated that the self-biasing coupler 32 may connect the cross-talk tube 34 to the outboard recliner shaft 26 without altering the scope of the invention.

To adjust the seat back between a variety of reclined seating positions, the occupant operates the recliner handle 18 to rotate the outboard recliner shaft 26 and unlock the outboard recliner 22. The rotation of the outboard recliner shaft 26 rotates the cross-talk tube 34, the self-biasing coupler 32 and the inboard recliner shaft 24 to unlock the inboard recliner 20. Because the self-biasing coupler 32 biases the cross-talk tube 34 in the under-biaed condition, there is a slight delay between the unlocking of the outboard recliner 22 and the unlocking of the inboard recliner 20. With both the inboard and outboard recliners 20, 22 in the unlocked positions, the seat back 14 can be pivotally adjusted between any of the potential reclined seating positions. After the seat back 14 has been adjusted to a desired reclined position, the occupant may release the handle 18 to allow the outboard recliner shaft 26 to return to the locked position. The rotation of the outboard recliner shaft 26 to the locked position rotates the cross-talk tube 34, the self-biasing coupler 32 and the inboard recliner shaft 24 to lock the inboard recliner 20. In the locked positions, the inboard and outboard recliners 20, 22 maintain the seat back 14 in the desired reclined position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A coupler for coupling a cross-talk tube of a vehicle seat with a shaft of a dual recliner assembly, the coupler comprising:
   a generally cylindrical body extending axially between an inboard end and an outboard end;
   the inboard end including an inboard aperture having an inboard planar surface; and
   the outboard end including an outboard aperture having an outboard planar surface;
   wherein the inboard planar surface and the outboard planar surface transition from an axially offset position to an axially aligned position when the coupler is installed with the cross-talk tube and the shaft of the dual recliner assembly.

2. The coupler of claim 1 wherein when the inboard planar surface and the outboard planar surface transition to the axially aligned position, the outboard end of the coupler is twisted relative to the inboard end of the coupler by an under-biased angle.

3. The coupler of claim 2 further comprising a plurality of legs extending between the inboard end and the outboard end wherein the plurality of legs deforms when the inboard planar surface and the outboard planar surface transition to the axially aligned position.

4. The coupler of claim 3 further comprising a projection extending from one of the inboard end and the outboard end adapted to matingly engage with a slot in the cross-talk tube.

5. A dual recliner assembly for a vehicle seat comprising:
   a first shaft;
   a second shaft;
   a cross-talk tube having a first tube end and an opposite second tube end, wherein the first tube end is fixedly coupled to the first shaft; and
   a coupler having a first coupler end and an opposite second coupler end, wherein the first coupler end is coupled to the second tube end, and wherein the first coupler end is twisted relative to the second coupler end, and wherein the first and second coupler ends are coupled to the second shaft.

6. The dual recliner assembly of claim 5 wherein:
   the second shaft comprises a planar section;
   the first coupler end comprises a first aperture having a first planar surface;
   the second coupler end comprises a second aperture having a second planar surface; and
   the first planar surface and the second planar surface align with the planar section of the second shaft.

7. The dual recliner assembly of claim 5 wherein:
   the second shaft comprises generally parallel planar sections;
   the first coupler end comprises a first aperture having generally parallel first surfaces;
   the second coupler end comprises a second aperture having generally parallel second surfaces; and
   the first surfaces and the second surfaces align with the planar sections of the second shaft.

8. The dual recliner assembly of claim 7 wherein the first coupler end is twisted by an under-biased angle relative to the second coupler end.

9. The dual recliner assembly of claim 8 wherein the coupler comprises a plurality of legs extending between the first coupler end and the second coupler end.

10. The dual recliner assembly of claim 9 wherein the second tube end includes a slot and wherein the first coupler end includes a projection to matingly engage with the slot in the cross-talk tube.

11. A method of assembling a cross-talk tube having a first tube end and an opposite second tube end onto a dual recliner assembly for a vehicle seat using a coupler having a first coupler end and an opposite second coupler end, wherein the dual recliner assembly includes a first recliner shaft and a second recliner shaft, the method comprising the steps of:
   coupling the first coupler end with the second tube end;
   sliding the first tube end axially onto the first recliner shaft;
   sliding the second coupler end and the cross-talk tube axially onto the second recliner shaft;
   sliding the first coupler end and the cross-talk tube axially onto the second recliner shaft wherein the insertion of the second recliner shaft into the first coupler end causes the first coupler end and the cross-talk tube to twist relative to the second coupler end; and
   securing the first tube end onto the first recliner shaft.

12. The method of claim 11 wherein the step of sliding the second coupler end and the cross-talk tube axially onto the second recliner shaft comprises the steps of:
   aligning a second planar surface on a second aperture in the second coupler end with a planar section of the second recliner shaft; and
   inserting the second recliner shaft into the second aperture.

13. The method of claim 12 wherein the step of sliding the first coupler end and the cross-talk tube axially onto the second recliner shaft comprises the steps of:
   engaging a tapered distal end of the second recliner shaft with a first planar surface on a first aperture in the first coupler end; and
   using the tapered distal end to apply installation forces on the first planar surface to cause the first coupler end and the cross-talk tube to twist relative to the second coupler end.

14. The method of claim 13 wherein the step of sliding the first coupler end and the cross-talk tube axially onto the second recliner shaft further comprises the steps of:
   rotationally deforming the coupler at a weakened section between the first coupler end and the second coupler end; and
   aligning the first planar surface with the second planar surface.

15. The method of claim 14 wherein the step of coupling the first coupler end with the second tube end comprises the steps of:

inserting the first coupler end into the second tube end; and matingly engaging a projection on the first coupler end with a slot extending longitudinally along the second tube end.

* * * * *